Patented Nov. 21, 1939

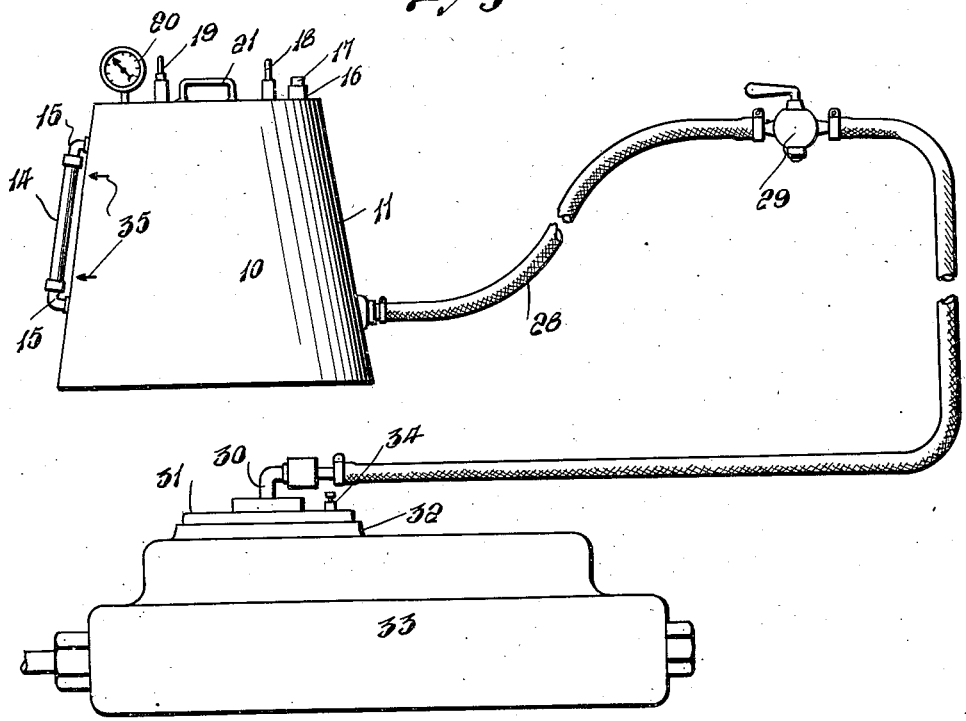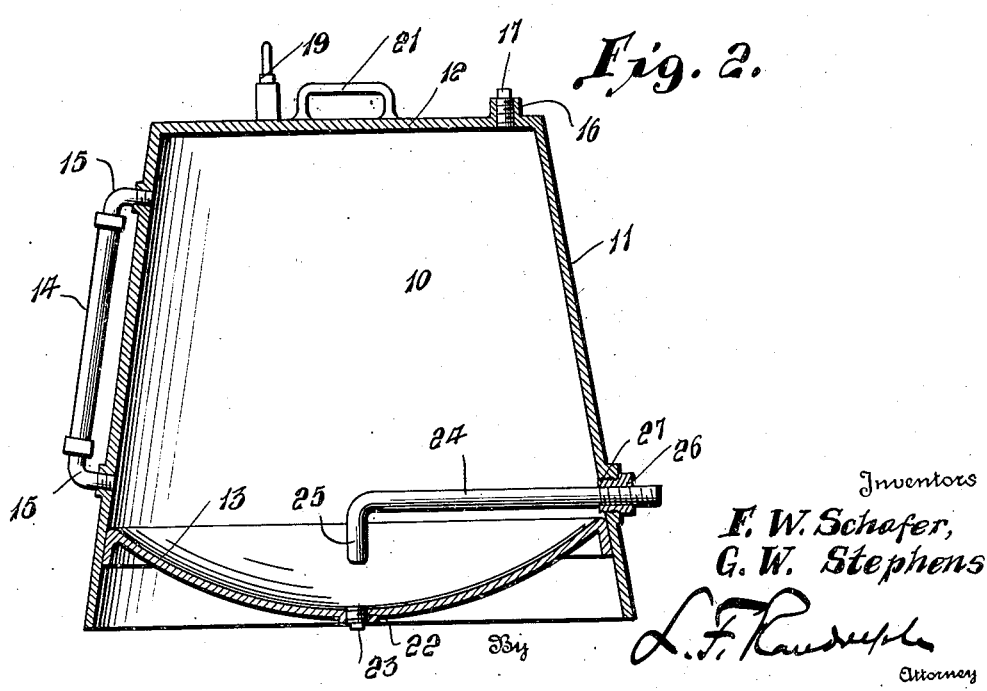

2,181,073

UNITED STATES PATENT OFFICE 2,181,073

HYDRAULIC BRAKE SYSTEM FLUSHER AND BLEEDER

Fred W. Schafer and George W. Stephens, Denver, Colo.

Application May 27, 1937, Serial No. 145,162

1 Claim. (Cl. 188—152)

This invention relates to an improved method and apparatus for flushing and refilling a hydraulic brake system.

The object of the invention is to provide means to introduce under pressure a cleaning fluid to a brake system to flush out the old brake fluid and any foreign matter that may be contained therein.

Another object of the invention is to successively flush the conduits leading to the different brakes, and to employ the fresh brake fluid to exhaust the cleaning fluid remaining in the system.

A further object of the invention is to employ the same apparatus to first flush the system and to then refill the same.

Other objects and advantages of the invention will become apparent from the specification of which the drawing forms a part, and wherein—

Figure 1 is an elevational view of the device connected to the master cylinder of a brake system, and Figure 2 is a central vertical sectional view of the container.

Referring more particularly to the drawing wherein like reference characters designate like or corresponding parts in the different views, a closed container 10 is provided with a side wall 11, top 12 and concave bottom 13.

A liquid level tube 14 is mounted on the L shaped pipes 15 mounted in wall 11 and communicating with the interior of container 10. An inlet 16 is provided in top 12, and is adapted to be closed by a threaded plug 17. Top 12 also mounts an air intake valve 18, a blow off valve 19, an air pressure gauge 20, and a handle 21. Bottom 13 is provided with an outlet 22 adapted to receive a threaded plug 23.

A pipe 24 provided with a downturned end 25 is mounted in plug 26 which is secured in opening 27 in wall 11.

The exposed end of pipe 24 is connected to one end of a hose 28 which is provided with a shut off valve 29. The opposite end of hose 28 is secured to pipe 30 connected to adapter 31 which is secured in the inlet 32 of the master cylinder 33. An exhaust valve 34 is mounted on adapter 31.

Container 10 is intended to be first partially filled with alcohol not to exceed the level of the upper arrow 35. Plug 17 is then replaced and air is introduced under pressure by means of valve 18 to a predetermined pressure to be indicated on gauge 20. If the pressure in container 10 becomes excessive it will be automatically released through blow off valve 19. Valve 29 is then opened permitting the alcohol under pressure to be forced through hose 28 into the master cylinder 33. Each of the conduits (not shown) from the master cylinder to the brake drums is provided with a bleeder valve. These bleeder valves are opened one at a time to permit the alcohol to force the old brake fluid and what foreign matter may be in the pipe out through the valve. When the alcohol runs clear the valve is closed and the next valve is opened and the operation repeated. Plug 23 is then removed and container 10 is drained. Container 10 is then partially filled with brake fluid and air under pressure is again introduced into the container 10. Valve 29 is then opened admitting the brake fluid to cylinder 33. The bleeder valves are opened to allow the brake fluid to force out any remaining alcohol. The bleeder valves are then closed and after the system is filled exhaust valve 34 is opened to release any air which may be in the system. Adapter 31 is then removed and the system is sealed and ready for use.

It is to be understood that only the preferred embodiment of the invention has been shown, the right being reserved to make such changes and modifications as do not depart from the spirit and scope of the invention.

We claim as our invention:

In a self-contained apparatus for flushing and bleeding hydraulic brake systems, an air tight tank having inlet and outlet openings provided with plugs for filling and draining said tank, an air valve for supplying compressed air thereto, a blow-off valve to release excess pressure, said tank having a raised concave bottom, a conduit connected adjacent one of its ends to said tank, said end depending downwardly into said bottom, an adapter connected to the opposite end of said conduit and adapted to be connected to the inlet of a brake system master cylinder, and an exhaust valve mounted in said adapter for releasing the air from said system.

FRED W. SCHAFER.
GEORGE W. STEPHENS.